(No Model.)
A. VREELAND.
PROTECTOR FOR PNEUMATIC TIRES.
No. 598,330. Patented Feb. 1, 1898.
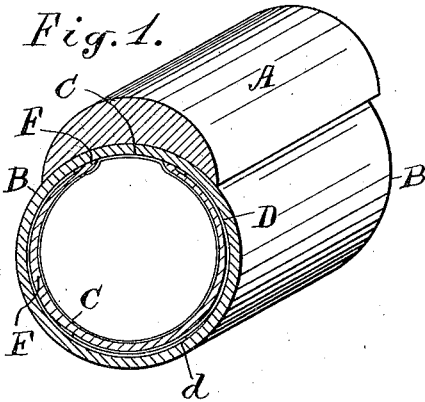
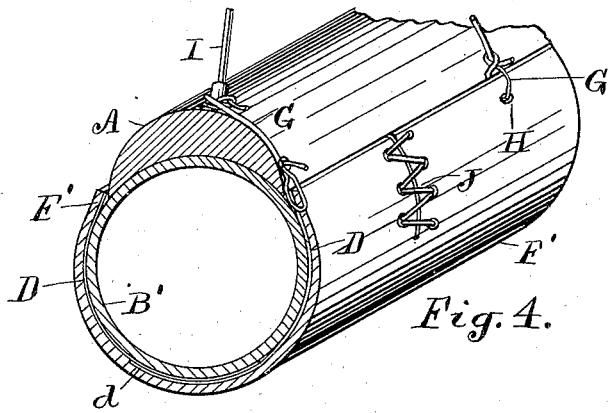
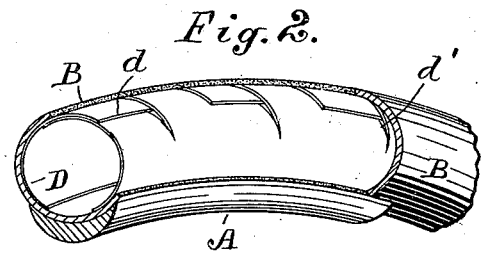
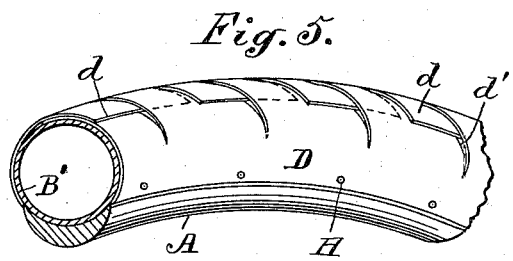
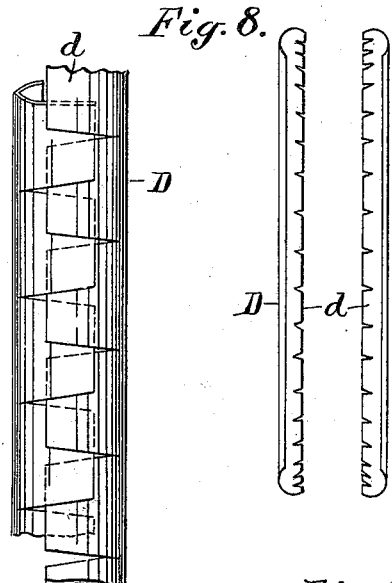
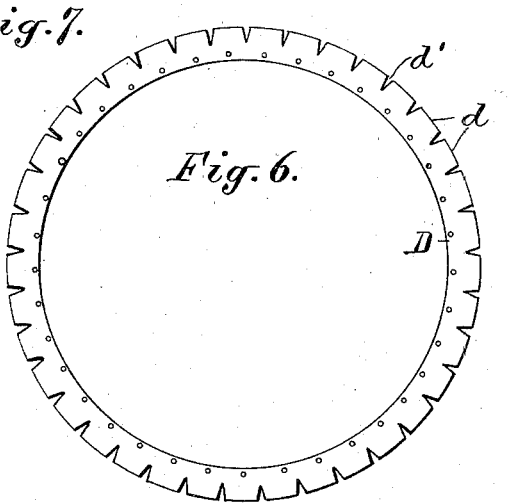
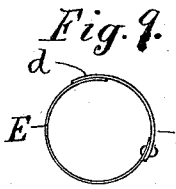
Attest:
L. Lee,
Edw. F. Kinsey.
Inventor.
Aaron Vreeland per
Thomas S. Crane, Atty

UNITED STATES PATENT OFFICE.

AARON VREELAND, OF EAST ORANGE, NEW JERSEY.

PROTECTOR FOR PNEUMATIC TIRES.

SPECIFICATION forming part of Letters Patent No. 598,330, dated February 1, 1898.

Application filed October 8, 1897. Serial No. 654,533. (No model.)

*To all whom it may concern:*

Be it known that I, AARON VREELAND, a citizen of the United States, residing at East Orange, county of Essex, State of New Jersey, have invented certain new and useful Improvements in Protectors for Pneumatic Tires, fully described and represented in the following specification and the accompanying drawings, forming a part of the same.

This invention comprises two annular metallic shields having notched edges to form tongues and arranged inside or outside of the outer tube of a pneumatic tire, with the tongues alternated and overlapped, so as to form a continuous flexible protector for the tube containing the air. When used with a double-tube tire, the shields are arranged between the two tubes and a guard or facing of leather is applied to the interior of the shields to prevent their movements from injuring the inner tube. When used with a single-tube tire, the shields are placed upon the exterior of the tube and are protected by a shoe or guard of india-rubber, which, with the shields, is held in place by lacing the shoe to the spokes of the wheel.

In the annexed drawings, Figure 1 is a sectional view in perspective of the double-tube tire provided with the shields, the tread of the tire being downward. Fig. 2 is a similar view with the tread upward and the outward shoe partly broken away to exhibit the shields. Fig. 3 is an outer view of portions of the shields with their tongues interlocked. Fig. 4 is a sectional view in perspective of a single-tube tire with the improvements applied. Fig. 5 is a similar view with the outer guard or shoe removed to exhibit the shield. Fig. 6 is a diagram of the metal blank for one of the shields, and Figs. 7 and 8 represent the two shields in readiness for use upon either the exterior or interior of the tire. Fig. 9 shows a nozzle for the protector.

A designates the wheel-rim, and B and C designate, respectively, the outer and inner tubes of a double-tube tire.

D designate the shields, and $d$ their tongues, each shield extending around the side of the tire, with the tongues projected across the tread. Each shield is made from an annular blank D', of sheet metal, formed with notches $d'$ to produce the tongue $d$, the notches facilitating the bending of the blank into the curved cross-section shown in Figs. 5, 7, and 8.

It will be noticed that the two shields shown in Figs. 7 and 8 are of identical form, but turned with the tongues adjacent, so as to be interlocked, as shown in Fig. 3. The tongues are alternated, so as to penetrate the notches in the opposite shield, and are overlapped continuously like fish-scales, each slanting outwardly at the same side of the notch.

The two shields constitute one protector, which may be inserted within the outer tube B (shown in Fig. 1) in the same manner as is common in inserting the inner tube, the annular shield being cut at one side for introducing it, except the outer tube B be open on the inner side throughout its entire length.

Where the annular protector is cut for introducing it, a nozzle E, made of a curved flap, may be riveted at the end of one of the shields, as shown in Fig. 9, to facilitate the introduction of the protector within the tube B, the end of the flap being loose to permit its contraction under pressure when the tire is in use.

The leather or rubber guard F is fitted to the interior of the protector before inserting it and the inner pneumatic tube is incased within the same.

The edges of the shield and of the guard upon the side next the wheel-rim A are considerably separated, as shown in Figs. 1 and 2, to facilitate the removal of the inner tube C or its introduction in the usual manner. The inner tube and the guard F are omitted from Fig. 2 to show the protector formed by the two shields within the outer tube and the separation between the two shields adjacent to the rim A.

When the inner tube C is expanded, as shown in Fig. 1, it holds the guard F and shields D firmly against the outer tube B, while the tread of the latter retains its flexibility, as the tongues $d$ upon the shields are perfectly flexible and able to move freely when the exterior of the tire is pressed at the tread.

Fig. 5 shows the application of the shields to the exterior of the single-tube tire B', the shields being applied to the opposite sides of the tire and the tongues $d$ overlapped upon the tread. F' designates the shoe, which is formed to cover the entire metallic protector and is connected therewith at the edges by cords G, extended through holes H, which are formed in the edges of the guard and the shield, as shown in Figs. 4 and 5. The cords are secured to the wheel-spokes I, as shown in Fig. 4, both edges of the shoe and the shields being thus secured in their operative position. The guard F' may be formed either of rubber or leather, the rubber being preferred, as it is not injured by moisture. The rubber would be molded to fit the exterior of the shield; but if leather be used it would be notched at the edges with gores, like the blank D' in Fig. 6, and such notches drawn together by lacings J, as shown in Fig. 4, so that the flat piece of leather may be conformed to the annular shape of the tire.

I am aware that a series of scales or flaps have been secured together by bands for application to the tread of a pneumatic tire, but such construction involves many parts, while my protector is formed merely of the two shields D, in each of which the tongues $d$ are a part of the annular blank D'.

By making each shield in one piece with its numerous tongues I provide a very cheap and simple construction.

It will be observed that in Figs. 2 and 3 the notches $d'$ between the tongues are of sufficient depth to permit the tongues to slide more or less toward one another when pressed upon any side of the tire, the blank being intentionally notched in a greater degree than the tongues are overlapped. Such construction is essential where the tongues are formed in one piece upon an annular shield and alternated as described, as it permits the tongues to yield freely when the tire is compressed, and I have therefore made special claim to the shield having notches formed of greater depth than the normal overlapping of the tongues.

Having thus set forth my invention, what I claim herein is—

1. The pneumatic-tire protector comprising the two shields D, applied to the opposite sides of the tire, and provided with tongues $d$ overlapped upon the tread of the tire, substantially as herein set forth.

2. The pneumatic-tire protector comprising the two shields D, applied to the opposite sides of the tire, and provided with tongues $d$ overlapped upon the tread of the tire, and an annular guard placed in contact with the shields, substantially as herein set forth.

3. The pneumatic-tire protector comprising the two shields D bent to fit the sides of the tire and formed with tongues $d$ extended across the tread of the tire and separated by notches $d'$, the tongues being alternated and their edges inclined in the same direction, as and for the purpose set forth.

4. The pneumatic-tire protector comprising two annular shields of identical shape, each encircling one side of the tire and both provided with tongues overlapped upon one another upon the tread of the tire, substantially as herein set forth.

5. The pneumatic-tire protector for double-tube tires, comprising the shields D having overlapped tongues $d$ and fitted within the outer tube B, and the guard F fitted as a lining to such shields, as and for the purpose set forth.

6. The pneumatic-tire protector for single-tube tires, comprising the shields D fitted to the outer sides of the tire with tongues $d$ overlapped upon the tread, the guard F' applied to the outside of the shields, and means, as the cords $g$, for securing the edges of the shields and guard to the wheel-rim, substantially as herein set forth.

7. The pneumatic-tire protector, comprising the two shields D bent to fit the sides of the tire and formed with tongues $d$ extended across the tread of the tire, and separated by notches $d'$ the tongues being alternated and the notches being of greater depth than the normal overlapping of the tongues, substantially as herein set forth.

In testimony whereof I have hereunto set my hand in the presence of two subscribing witnesses.

AARON VREELAND.

Witnesses:
W. F. D. CRANE,
THOMAS S. CRANE.